United States Patent [19]
Solberg et al.

[11] Patent Number: 5,363,768
[45] Date of Patent: Nov. 15, 1994

[54] PROPELLANT GAS-GENERATION SYSTEM FOR CANISTER EJECTION

[75] Inventors: Mark A. Solberg, Edgewood; James A. Hartwell, Elkton, both of Md.

[73] Assignee: Thiokol Corporation, Ogden, Utah

[21] Appl. No.: 679,305

[22] Filed: Apr. 2, 1991

[51] Int. Cl.$^5$ ............................................. F42B 5/00
[52] U.S. Cl. ................................. 102/430; 102/283; 102/357; 102/489
[58] Field of Search ............... 102/283, 284, 285, 286, 102/287, 289, 290, 291, 374, 376, 393, 340, 342, 351, 357, 430, 489, 505

[56] References Cited

U.S. PATENT DOCUMENTS

| | | |
|---|---|---|
| 751,386 | 2/1904 | Davis .................................. 102/283 |
| 2,743,580 | 5/1956 | Loeb, Jr. . |
| 3,176,618 | 4/1965 | Forsberg et al. . |
| 3,496,870 | 2/1970 | Fulmer ............................... 102/284 |
| 3,737,348 | 6/1973 | Schultz . |
| 3,763,787 | 10/1973 | Schultz . |
| 3,855,176 | 12/1974 | Skidmore .......................... 102/291 |
| 4,615,270 | 10/1986 | Bell ..................................... 102/289 |
| 4,792,423 | 12/1988 | Craig et al. . |

FOREIGN PATENT DOCUMENTS 2633652  2/1978  Germany ............................ 102/290

*Primary Examiner*—Harold J. Tudor
*Attorney, Agent, or Firm*—Ronald L. Lyons; Kendrew H. Colton

[57] ABSTRACT

A propellant system is disclosed which includes a propellant applied to at least one surface of a substrate which is in the form of a strip. The propellant strip is adhesively attached to itself in a configuration which conceals propellant within the configuration and which allows the attached strip to peel away from itself under applied forces thereby resulting in smooth and continuous exposure of propellant for burning. The system is directed to use with ejectable projectiles which are slidably disposed within a canister or casing. The propellant system is interconnected between the projectile and the canister which houses the projectile. The propellant is urged to peel, and thus expose propellant for burning, as the projectile is ejected from the canister.

14 Claims, 6 Drawing Sheets

PROPELLANT GAS-GENERATION SYSTEM FOR CANISTER EJECTION

BACKGROUND

1. Field

This invention relates generally to ejectable projectiles and propellants for ejecting those projectiles from casings within which they are disposed. Specifically, this invention is directed to solid propellant systems for generating gases which eject projectiles from canisters or casings at a controlled velocity.

2. State of the Art

Projectiles, such as rockets, missiles, and the like, are well-known in the aerospace and military industries. Propellants which are associated with such projectiles are also well-known. Some projectiles, such as rockets or missiles, typically comprise a warhead and an internal motor for urging the projectile forward to its target. Internal motors for driving the projectile may be of a solid propellant type, a liquid propellant type, or some other type known to those skilled in the art. Frequently, rockets, missiles, and similar projectiles are disposed within a closed-end casing or canister prior to firing. When fired, projectiles of this type must first be ejected from the canister. Projectiles which have an internal motor, i.e. rockets, must first be ejected from the canister before the rocket motor is ignited to prevent damage to the canister. Projectiles which do not have internal motors, i.e. bomblets, submunitions, flares, etc., must also be ejected from the canister for glide or free fall to a chosen target.

Solid propellant grains generally take many forms. For example, some propellants are poured into the rocket casing to fill a substantial percentage of it. Other propellant grains take the form of a carpet roll which is placed in the rocket casing end-to-end. Examples of such propellants are disclosed in U.S. Pat. No. 3,763,787 to Schultz, issued Oct. 9, 1973, and U.S. Pat. No. 3,737,348 to Schultz, issued Jun. 5, 1973, both of which disclose a double base propellant applied to both sides of a reinforcing material and rolled into a carpet-type roll. The reinforcing material provides a space between the propellant surfaces sufficient to provide a very large area of combustion. The roll is placed within a rocket motor casing so that the roll is in a cross-sectional orientation to the casing. The carpet roll is bonded to the inner casing of the rocket motor and is attached by adhesive means to a head plate.

U.S. Pat. No. 4,792,423 to Craig, et al., issued Dec. 20, 1988, discloses the molding together of binder, fuel, oxidizer, and additives to form a propellant which may then be formed into any desired shape, including filament winding, helical roll, and carpet roll. Craig is particularly directed to molding of propellant components to achieve variable burn rates and suggests that a particular shape may help achieve a variable burn.

These and other prior art propellant grain configurations are typically designed to provide a geometrically increasing surface area of propellant for burning. That is, as the exposed surface of the propellant burns, it exposes an ever increasing surface area for burning, and the resulting generation of gas from the burning propellant increases geometrically.

Consequently, there remains a need for a propellant gas-generating system for use with ejectable projectiles which provides controlled burning of the propellant at a rate related to the displacement of the projectile.

There is also a need for a propellant system which provides controlled burning as a function of the acceleration of the projectile.

SUMMARY OF THE INVENTION

According to the present invention, a propellant system is provided for use in a class of projectiles which are disposed within an outer casing or canister and which are ejectable from the canister. The propellant system of the invention provides a configured propellant grain, the burn surface of which is dependent upon the acceleration rate of the projectile with which it is associated. That is, the gas generated by the burning propellant is a function of the rate at which the ejectable projectile is displaced from the canister. Although the invention is applicable to ejectable projectiles generally, this disclosure is directed to rockets by way of example.

The propellant system of the present invention is configured to provide a surface area which is mechanically exposed for combustion by displacement of the exiting projectile. That is, the surface of the propellant is burned at a rate which is directly related to the rocket displacement. The propellant system of the present invention provides a rapid-burning propellant grain which generates enough gas pressure within the canister to eject the rocket quickly from the canister yet without over pressurizing the canister.

Where a canister is adapted for use with different projectiles of differing mass, the ejection acceleration as a function of pressure will generally differ. The gas generation system of this invention compensates for such differences, controlling the canister pressure regardless of the particular projectile which is ejected.

The propellant gas-generation system of the invention generally comprises a propellant adhered to a non-burning substrate. The propellant and substrate take the general form of a strip having a specific width and length. The strip is then adhesively attached to itself in a manner which conceals part of the propellant and which will allow the strip to peel progressively and continuously from itself to expose concealed propellant for burning. Thus, two different adhesive joints, one stronger than the other, are formed. The substrate is a flexible material such as rubber which is not combustible in this application.

The propellant is joined to the substrate using a tenacious adhesive with a relatively high peel strength. Peel strength is defined as the pounds per linear inch (pli) required to separate one surface from another at a particular angle.

The strip of combined propellant and substrate is then attached to itself to form a relatively weak joint. The adhesive used to join the strip of combined propellant and substrate to itself has a lower peel strength than the adhesive binding the propellant to the substrate. Consequently, the weaker peel strength adhesive will allow peeling of the strip from itself while the stronger peel strength will prevent peeling of the propellant from the substrate during detachment of the strip from itself.

The gas-generation system of the present invention is directed in one embodiment to the ejection of rockets which are slidably disposed within an outer casing or canister. One end of the propellant/substrate strip is connected to the rocket, e.g. to the rear end of the rocket. The other end of the propellant/substrate strip is connected in some manner to the closed end of the canister. One end of the propellant/substrate strip is provided to expose a portion of the propellant. Means for igniting the exposed propellant is provided within the canister, such as a pyrogen or pyrotechnic igniter which directs hot gases on the exposed surface.

Following ignition of the exposed propellant exhaust given off from the burning propellant causes an increase in pressure within the closed end of canister and urges the rocket to move outwardly from the canister. As the rocket moves outwardly, it pulls the connected end of the propellant/substrate strip outwardly thereby causing the strip to peel from itself to continuously and progressively expose more propellant for burning. Thus, as more pressure builds, the rocket moves outwardly causing more propellant to burn and causing more pressure to build until the rocket has been ejected from the canister. The rocket is smoothly ejected without a buildup of excessive pressure in the casing.

The gas-producing units are easily constructed and provide an inexpenseive means for ejecting projectiles from a canister. The pressure curve is easily tailored for each application by varying the propellant strip dimensions, mass and type of propellant, and other factors. A high batch-to-batch uniformity is readily maintained.

The propellant system of the present invention is also directed to use in ejecting non-motorized projectiles such as bombs, bomblets, submunitions, flares, chaff and the like, as well as such munitions as torpedoes from seagoing vessels.

BRIEF DESCRIPTION OF THE DRAWINGS

In the drawings, which illustrate what is currently regarded as the best mode for carrying out the invention.

DETAILED DESCRIPTION OF THE PREFERRED EMBODIMENT

Figure 1:
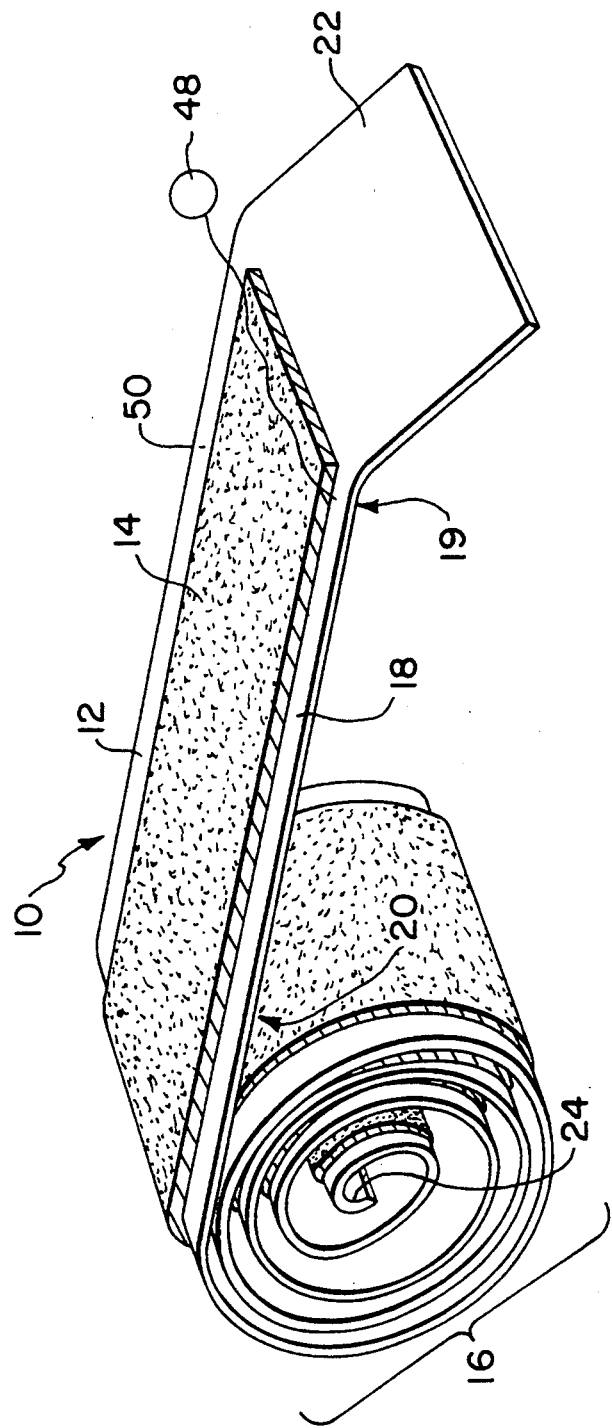
FIG. 1 is a perspective view of the outer surface of a partially detached propellant gas-generation system of the invention.

The propellant gas-generation system, designated generally 10 in FIG. 1, includes a substrate 12 having opposing surfaces and a propellant 14 adhered to at least one opposing surface of the substrate 12. The substrate 12 and propellant 14 are generally formed into an elongated strip, hereinafter referred to as the propellant strip 16. The propellant 14 is depicted as being disposed on the outer facing surface 18 of the substrate 12, but alternatively, it may be attached to the inside surface, designated 19. Attachment to the outside surface 18 is generally preferred because it provides more initially exposed propellant surface for generating gas pressure within the canister.

The substrate 12 of the propellant strip 16 is preferably a resilient material such as rubber but may be constructed of any suitable material which will adhere to the propellant 14 and which will allow the propellant strip 16 to be formed into any desired shape.

Many different propellants are suitable for use in the propellant gas-generation system of the present invention. Suitable propellants are those which have a sufficiently high strain capacity to allow the propellant strip 16 to be formed into a desired shape, such as a roll. Strain capacity defines the amount of deformation which the propellant may undergo when subjected to forces, such as those experienced when in a rolled form. The maximum strain capacity of a propellant in a rolled form is dependent upon the thickness of the propellant when applied to the substrate and the dimensions of the propellant strip when attached to itself. That is, when the propellant strip is rolled in carpet-roll fashion, for example, the maximum strain capacity (EM) is defined by the equation $$\frac{\pi D_o - \pi D_i}{\pi D_i} \leq EM$$

where $D_o$ is the diameter of the rolled propellant strip measured from its outer circumference, and $D_i$ is the diameter of the rolled propellant strip measured from its inner circumference at the center of the roll. Thus, the strain capacity of a propellant will be less when the propellant is applied to the substrate in a thin layer. Conversely, when the propellant is applied more thickly to the substrate, the candidate propellant must have a higher strain capacity, or the propellant strip must be rolled allowing for a larger diameter.

A particularly suitable propellant is one which contains a carboxy-terminated polybutadiene (CTPB) binder with trifunctional epoxy liquid. The solids of such a propellant may consist of seventy-seven percent (77%) ammonium perchlorate (AP), five percent (5%) aluminum, and two percent (2%) iron oxide. Propellants such as plastisols and double base propellants are also suitable for use in the invention.

The propellant 14 is adhered to the substrate 12 using a suitable adhesive. Suitable adhesives for attaching the propellant 14 to the substrate 12 are those which have a relatively strong peel strength and form flexible joints immune to cracking. Peel strength is defined as the amount of force which must be employed to separate two adhered surfaces at a particular angle. Peel strength is measured in pounds per linear inch (pli).

A particularly suitable adhesive for tenaciously attaching the propellant to the substrate is TI-H-300, an adhesive manufactured by Thiokol Corporation (Elkton, MD), the ingredients of which include carboxy-terminated polybutadiene (CTPB), trifunctional epoxy liquid, chromium octoate, and carbon black. Any flexible adhesive which effects a bond between the propellant and the substrate and which has a relatively stronger peel strength as compared to the adhesive used to join the propellant strip together (described below) is suitable for use in the invention.

The propellant strip 16 is attached to itself in a manner which conceals propellant within the configured strip and which allows uniform and continuously progressive exposure of the concealed propellant 14 as the propellant strip is peeled from itself. For example, as illustrated by FIG. 1, the propellant strip 16 may be rolled in carpet-roll fashion. When the propellant strip is unrolled (i.e., detached from itself), the outer surface 18 of the substrate 12 is continuously and progressively exposed, generally in the area designated 20, thereby exposing more and more of the propellant 14 as the unrolling continues.

Preferably, the opposing edges of the propellant strip 16 are coated with a sealant 17 for deterring combustion from those edges. Thus, when the strip 16 is configured in a carpet-roll fashion, the combustion proceeds primarily from one direction only. The resulting gas production curve is more uniform from batch to batch.

Figure 5:
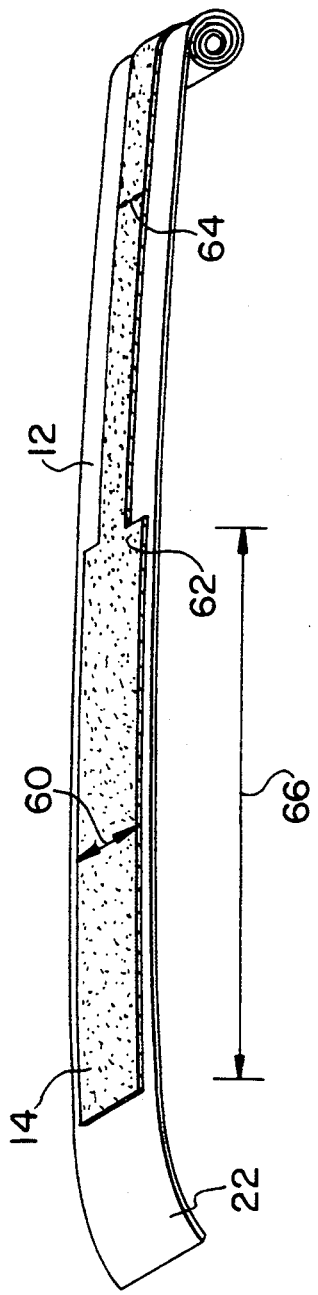
FIG. 5 is a perspective view of another embodiment of the outer surface of a partially detached propellant gas-generation system of the invention.

The propellant 14 may preferably, in some cases, be applied on a grain of varying width and/or thickness to modify the gas-generation rate. Thus, as depicted in FIG. 5, the propellant layer width 60 is decreased at point 62 to width 64 for reducing the gas-generation rate when the projectile is displaced distance 66. The propellant dimension may be varied along the strip to achieve any desired pressure curve. This concept is more clearly understood by the discussion which follows.

Figure 2:
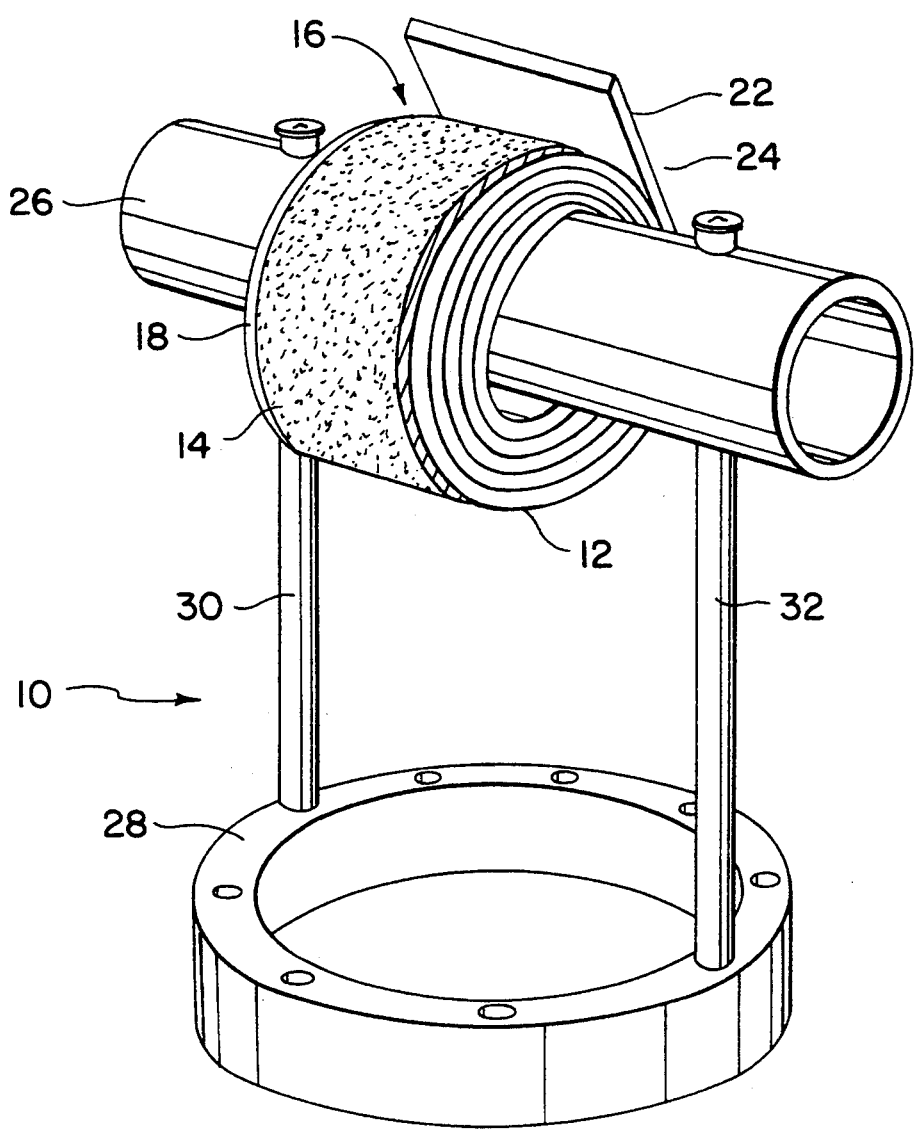
FIG. 2 is a perspective view of one embodiment of the invention ready for mounting within a canister of the type which houses a rocket.

One end 22 of the propellant strip 16 must be connected to the end of the rocket, and the other end 24 of the propellant strip 16 must be connected to the closed end of the outer casing or canister within which the rocket is disposed. One method of connecting the propellant strip 16 to the canister is to wind one end 24 of the propellant strip 16 about a cylinder or mandrel 26. The mandrel 26 is then secured in some manner to the inside surface of the canister. As illustrated by FIG. 2, one means of securing the mandrel 26 to the inside surface of the outer casing is to attach the mandrel securely to a ring 28 using two rods 30 and 32 interconnected between the mandrel 26 and the ring 28. The ring is secured to the canister by bolt, screw, or other means.

Figure 3:
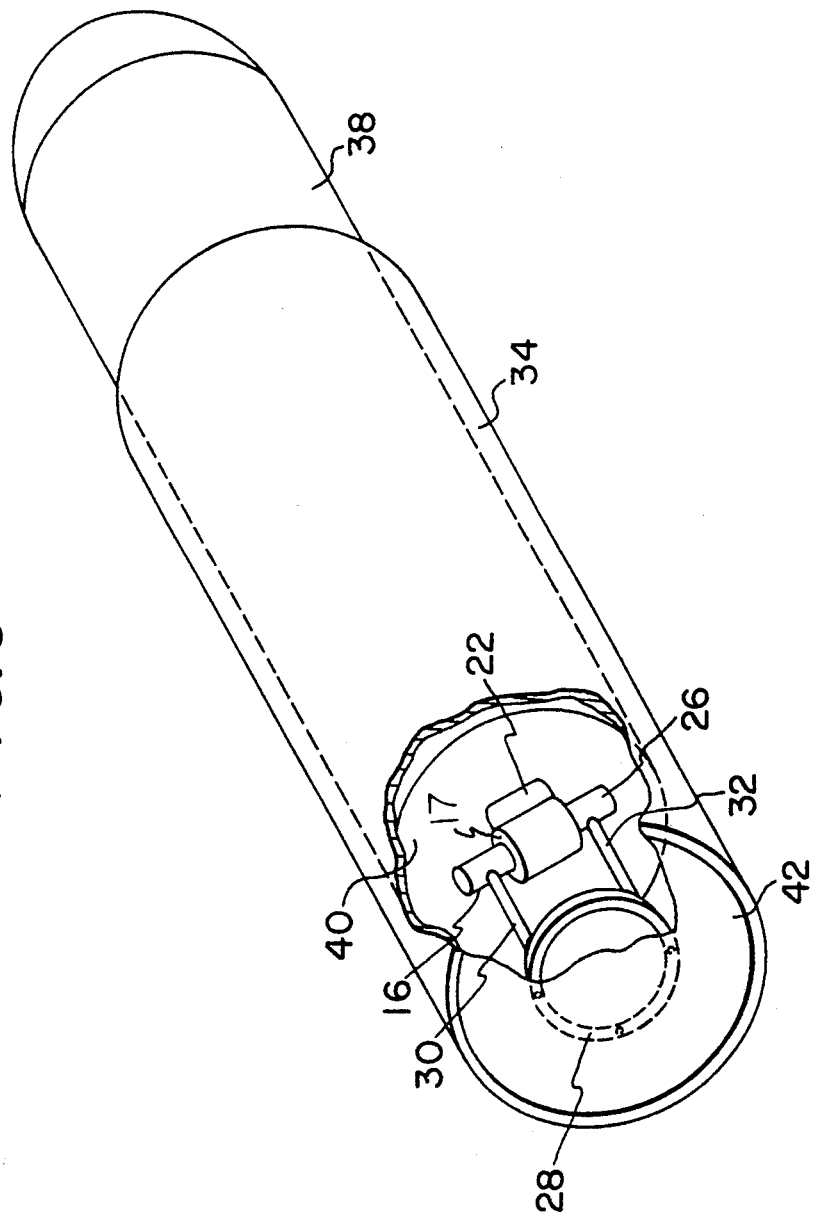
FIG. 3 is a partially fragmentary perspective view of the propellant system installed within a canister.

FIG. 3 more fully illustrates the placement of the propellant strip 16 in the canister 34 within which the rocket 38 is disposed. The free end 22 of the propellant strip 16 is attached to the bottom 40 of the rocket 38 so that when the rocket is ejected from the canister 36, it unrolls the propellant strip. The attachment may be by a strong adhesive or other mechanical means. The ring 28 is secured to the inside face of the bottom 42, i.e. closed end, of the canister 34. The propellant strip 16 may be attached in any manner to the canister 34 as long as the propellant strip is able to peel away from itself or, as suggested by FIGS. 1-3, is able to be unrolled.

The propellant strip may be attached to itself in any configuration which provides the desired progressive exposure of the concealed propellant for burning as it is unrolled by the ejecting rocket. The desired configuration must also be one which provides a first free end of the propellant strip for attachment to the rocket and a second free end of the propellant strip for attachment to the canister. Such configurations include, for example, accordion folding or helical winding into a corkscrew shape. Rolling, folding, or winding configurations as previously described provide a type of detachment of the strip which continuously exposes propellant for burning as the rocket is ejected from the canister.

Figure 4:
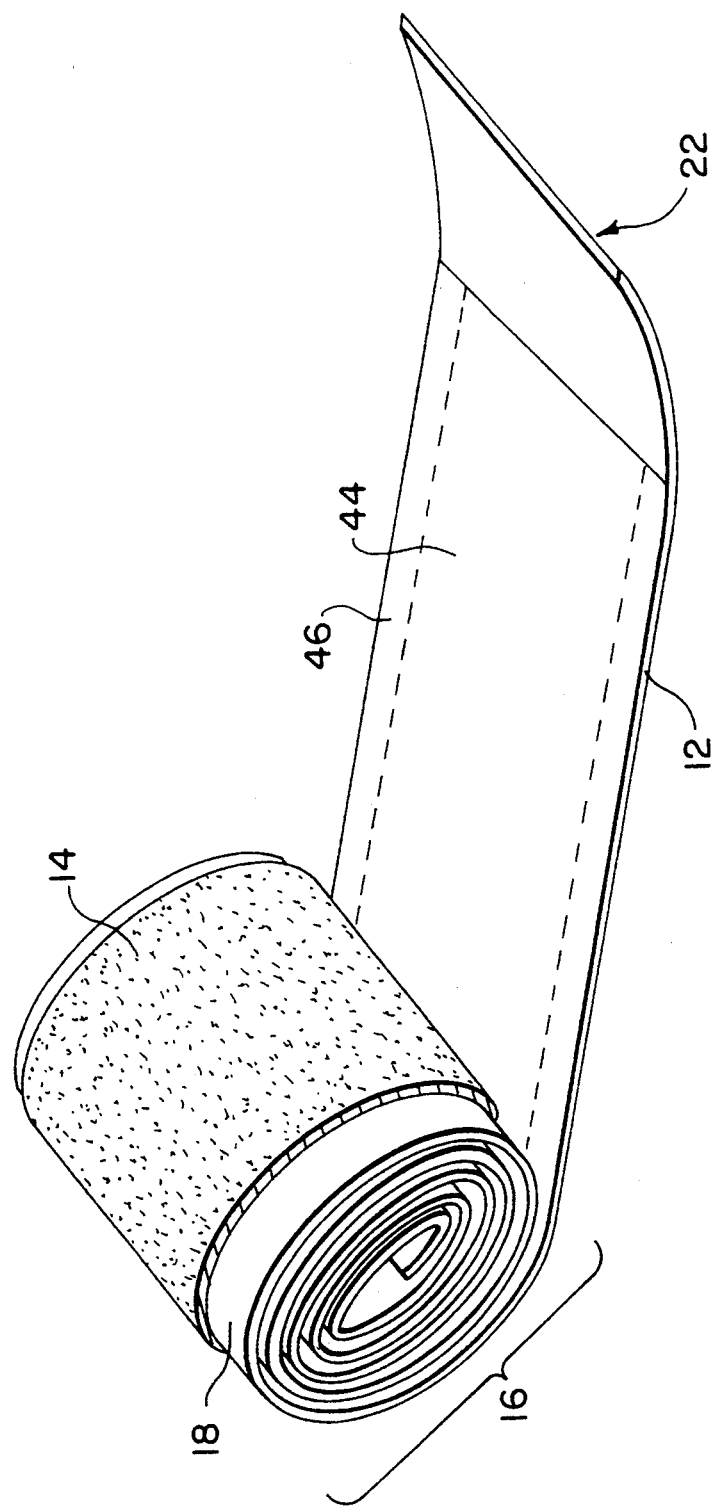
FIG. 4 is a perspective view of the inner surface of a partially detached propellant gas-generation system.

The propellant strip is attached to itself by use of a weak adhesive (as compared to the relatively tenacious adhesive used to adhere the propellant to the substrate). As illustrated by FIG. 4, the weak adhesive 44 is applied to the inner facing surface 46 of the substrate 12. Any flexible adhesive may be used for joining the propellant strip together which is capable of maintaining the attachment of the propellant strip to itself (i.e., maintained in a roll) but which displays a sufficiently low peel strength to allow the attached propellant strip to peel away from itself (i.e., to unroll).

A particularly suitable adhesive for attaching the propellant strip to itself is TI-H-300 adhesive (described above) in admixture with Chemlok 234, an adhesive manufactured by Lord Corporation (Erie, PA). The combination of TI-H-300 adhesive with Chemlok 234 adhesive produces an adhesive having an approximate four-fold decrease in peel strength as compared to TI-H-300 adhesive without Chemlok 234 adhesive. The difference in peel strengths between the adhesive used to adhere the propellant to the substrate and the adhesive used to join the propellant strip together allows the propellant strip to peel away from itself without causing the propellant to dislodge from the substrate. Both the weak and the strong adhesives should be resilient enough to avoid cracking when the propellant strip is attached to itself.

The TI-H-300 adhesive is also an excellent sealant for coating the lateral edges of the propellant strip 16 to deter combustion from those edges inwardly.

Means 48 for igniting the propellant is associated with the propellant gas-generation system, as suggested by FIG. 1. The means for igniting the propellant may be any method or device which will initiate burning of the propellant 50 exposed near end 22 of the propellant strip 16. Types of igniters are well-known by those skilled in the art and are typically chosen on the basis of design, resistance to environmental effects, cost, and other factors.

The exposed propellant ignites and burns down the length of the propellant strip until all of the exposed propellant has burned. Enough pressure is developed from the burning of the initially exposed propellant to urge the rocket or other projectile forward. As the rocket moves out of the casing, the forward motion of the rocket causes the propellant strip to detach from itself thereby exposing more propellant for burning. As the newly exposed propellant burns, gas is continuously produced to continuously increase the pressure which displaces the rocket from the canister. The detachment of the propellant strip continues until the propellant strip has been completely detached from itself, i.e. unwound, and all of the propellant has burned. The rocket is thus ejected from the canister and is separately fired and directed toward a target. The mechanically controlled increasing surface area of exposed propellant provides smoothly increasing pressure within the casing as the propellant burns.

Figure 6:
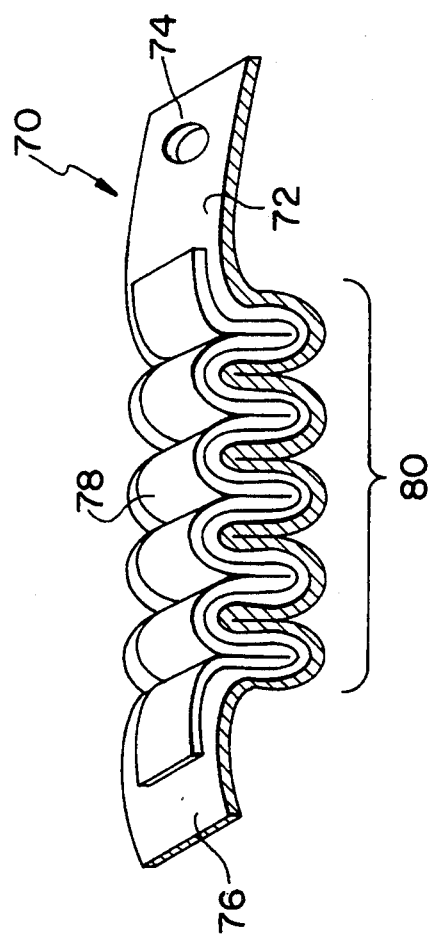
FIG. 6 is a perspective view of a further embodiment of the invention.

FIG. 6 depicts an exemplary configuration which is folded.

In FIG. 6, strip 70 includes a substrate 72 having ends 74 and 76 for attachment to the canister and to the ejectible, respectively. A layer of propellant 78 overlies the substrate 72 and the combination folded into accordion pleats 80 to conceal a large portion of the propellant 78. As ends 74 and 76 are pulled apart, the pleats unfold to permit full combustion of the propellant.

Figure 7:
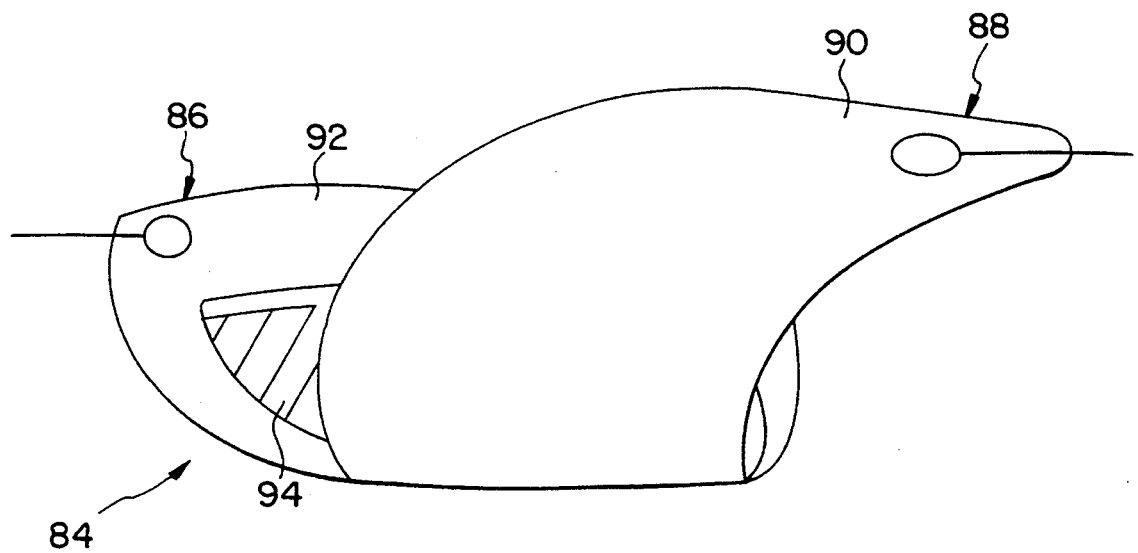
FIG. 7 is a perspective view of another embodiment of the invention.

In FIG. 7, strip 84 is wound similarly to that shown in FIG. 1, but the connections to the canister and the ejectible are on opposite sides 86 and 88 of the ends 90 and 92 of strip 84. Thus, as the ends 90 and 92 are pulled apart, the roll detaches helically, like the common fly paper roll, to expose fresh propellant surface 94 for combustion.

It should be understood that it may be desirable to expose the propellant at a greater velocity than the exiting velocity of the rocket. Thus, for example, the free end 22 of the strip 16 may be connected to the rocket through a series of pulleys which increases the velocity of the strip relative to the rocket. A higher velocity may be required to prevent the propellant from extinguishing with slowly ejected projectiles. The required velocity of unrolling or unfolding is a function of the propellant burn rate and propellant thickness. Lower unrolling/unfolding velocities may be used with propellants of greater thickness and/or lower burn rate. Propellants having a high burn rate and applied in a thin layer, e.g. 0.1 cm, may require unrolling velocities as high as 6–8 meters/sec. or more to prevent extinguishment.

The particular dimensions of the propellant strip, including length and width of the strip and thickness of the propellant on the substrate, are dependent upon many factors. Among those factors are the size, shape and weight of the rocket, the size of the canister, and the type of propellant being used. The pressurization curve is readily calculated for any projectile and propellant strip configuration. The apparatus of the invention may be used to eject a wide variety of objects from a casing or canister. Thus, for example, the invention is useful for ejecting objects from aircraft, seagoing vessels, and stationary sites.

The invention provides a reliable gas generation which is adaptable to the ejection of any sized object from a canister. The apparatus is easily and inexpensively constructed. The ejection pressure may be pre-controlled to any desired time function.

The specific details described above as illustrative of the present invention are by way of example and are not intended to limit the scope of the invention as claimed hereinafter.

What is claimed:

1. A gas-generating system for ejecting a projectile from a closed-end canister in which the projectile is disposed comprising:
   a substrate having opposing surfaces and having dimensions of width and length defining a strip, said strip of substrate having a first end and a second end and opposing lateral edges;
   a propellant adhered to at least one of said opposing surfaces of said strip of substrate along said length thereof, with
   an adhesive, said adhesive also adhering said strip of substrate to itself at portions along said length, and means for applying a force between said first and second ends, wherein portions of said propellant are concealed and wherein said portions of attachment progressively detach under said force applied between said first and second ends thereby exposing said concealed propellant to progressive combustion.

2. The propellant system according to claim 1 wherein a further portion of said adhered propellant is exposed for initial combustion.

3. The propellant system according to claim 1 further comprising a means for securing said second end of said strip of substrate to a canister containing a projectile and further comprising a means for securing said first end of said strip of substrate to said projectile.

4. The propellant system according to claim 1 wherein said propellant is attached to said substrate with a first adhesive and said strip of substrate is adhesively attached to itself with a second adhesive differing from said first adhesive.

5. The propellant system according to claim 4 wherein said first adhesive has a stronger peel strength than said second adhesive.

6. The propellant system according to claim 1 further comprising a means for igniting said propellant.

7. The propellant system according to claim 1 wherein said strip of substrate with adhered propellant is adhesively attached to itself to form a rolled strip.

8. The propellant system according to claim 1 wherein said strip of substrate with adhered propellant is adhesively attached to itself in an accordion-type, folded configuration.

9. The propellant system according to claim 1 wherein said strip of substrate with adhered propellant is adhesively attached to itself by helical winding to form a corkscrew configuration.

10. The propellant system according to claim 1 wherein said substrate is a non-combusting material.

11. The propellant system according to claim 4 wherein each said lateral edge is coated with a sealant to deter combustion initiation from said lateral edges.

12. The propellant system according to claim 11 wherein said sealant comprises said second adhesive.

13. The propellant system according to claim 11 wherein said sealant includes carboxy-terminated polybutadiene and a trifunctional epoxy liquid.

14. The propellant system according to claim 1 wherein said propellant comprises one of (a) aluminized ammonium perchlorate in a carboxy-terminated polybutadiene binder; (b) a plastisol; and (c) a double base propellant.

* * * * *